US012627552B2

(12) United States Patent
Jong et al.

(10) Patent No.: US 12,627,552 B2
(45) Date of Patent: May 12, 2026

(54) LOOPBACK SIGNAL, RECEIVER AND TRANSMITTER FOR SYNCHRONIZATION

(71) Applicant: Hughes Network Systems, LLC, Germantown, MD (US)

(72) Inventors: James Jehong Jong, North Potomac, MD (US); Tahereh Fazel, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 556 days.

(21) Appl. No.: 18/184,276

(22) Filed: Mar. 15, 2023

(65) Prior Publication Data
US 2024/0039776 A1      Feb. 1, 2024

Related U.S. Application Data

(60) Provisional application No. 63/370,079, filed on Aug. 1, 2022.

(51) Int. Cl.
H04B 7/185 (2006.01)
H04B 17/336 (2015.01)
(Continued)

(52) U.S. Cl.
CPC ..... H04L 27/2657 (2013.01); H04B 7/18513 (2013.01); H04B 17/336 (2015.01); H04L 25/0202 (2013.01); H04L 27/26524 (2021.01)

(58) Field of Classification Search
None
See application file for complete search history.

(56) References Cited

U.S. PATENT DOCUMENTS 8,068,448 B1    11/2011  Foley et al.
10,823,856 B2   11/2020  Raghupathy et al.
(Continued)

FOREIGN PATENT DOCUMENTS

CN       113238261 A    8/2021
WO     2008004154 A2    1/2008

OTHER PUBLICATIONS

Huang Yihang et al: "Adaptive Bootstrap Design for Hybrid Terrestrial Broadcast and Mobile Communication Networks", IEEE Transactions on Broadcasting, IEEE Service Center, Piscataway, NJ, US, vol. 65, No. 4, Dec. 1, 2019 (Dec. 1, 2019), pp. 755-769, XP011758866, ISSN: 0018-9316, DOI: 10.1109/TBC.2019.2909196 [retrieved on Dec. 6, 2019] Sections I and II.
(Continued)

*Primary Examiner* — Minh Trang T Nguyen
(74) *Attorney, Agent, or Firm* — Capitol City TechLaw; Jasbir Singh

(57)          ABSTRACT

A loopback receiver to synchronize timing and frequency with a loopback signal relayed to the loopback receiver, the loopback receiver including: an Rx signal representing the loopback signal received at the loopback receiver; and a common Fast Fourier Transform (FFT) to estimate, during an acquisition mode and a tracking mode, an estimated timing offset and an estimated frequency offset of the Rx signal compared to the loopback signal, wherein the loopback signal includes a burst including a GOLD Pseudo Noise (PN) sequence having a good circular correlation and the GOLD PN sequence has cross-correlations within a set. Some embodiments may eliminate a bias of the estimated timing offset and the estimated frequency offset with double linearization.

20 Claims, 5 Drawing Sheets

(51) Int. Cl.
    *H04L 25/02*          (2006.01)
    *H04L 27/26*          (2006.01)

(56)                    References Cited

U.S. PATENT DOCUMENTS

| | | | | |
|---|---|---|---|---|
| 2006/0215778 A1* | 9/2006 | Murthy | ............... | H04L 27/2678 |
| | | | | 375/260 |
| 2015/0304149 A1* | 10/2015 | Kim | ...................... | H04W 56/00 |
| | | | | 375/260 |
| 2015/0333876 A1* | 11/2015 | Svedman | .............. | H04L 1/1896 |
| | | | | 370/242 |
| 2018/0292538 A1* | 10/2018 | Raghupathy | ............ | G01S 19/45 |

OTHER PUBLICATIONS

International Search Report for PCT/US2023/070795.
Marco Maffei et al: "Code detection at Launch and Early Orbit Phase for CDMA TT&C", 2008 10th International Workshop on Signal Processing for Space Communications (SPSC); Oct. 6-8, 2008; Rhodes Island, Greece, IEEE, Piscataway, NJ, USA, Oct. 6, 2008 (Oct. 6, 2008), pp. 1-12, XP031365892, ISBN: 978-1-4244-2572-3 Sections IV and VII.
Michael S Braasch et al: "GPS Receiver Architectures and Measurements", Proceedings of the IEEE, IEEE. New York, US, vol. 87, No. 1, Jan. 1, 1999 (Jan. 1, 1999), XP011044135, ISSN: 0018-9219 pp. 50,55.

* cited by examiner

| ACQ Itt. | Bias(F) <= 5 Hz | 5 Hz <= Bias(F) < 10 Hz | 10 Hz <= Bias(F) < 15 Hz | 15 Hz <= Bias(F) < 20 Hz |
|---|---|---|---|---|
| 1 | 99.23% | 0.70% | 0.08% | 0.00% |
| 2 | 99.57% | 0.38% | 0.06% | 0.00% |
| 3 | 99.63% | 0.32% | 0.05% | 0.00% |
| 4 | 99.66% | 0.29% | 0.05% | 0.00% |
| 5 | 99.67% | 0.28% | 0.05% | 0.00% |
| 6 | 99.67% | 0.28% | 0.05% | 0.00% |
| 7 | 99.67% | 0.28% | 0.05% | 0.00% |
| 8 | 99.67% | 0.28% | 0.05% | 0.00% |
| 9 | 99.67% | 0.28% | 0.05% | 0.00% |
| 10 | 99.67% | 0.28% | 0.05% | 0.00% |

| ACQ Itt. | Bias(T) <= Ts/32 | Ts/32 <= Bias(T) < 2*Ts/32 | 2*Ts/32 <= Bias(T) < 3*Ts/32 |
|---|---|---|---|
| 1 | 86.71% | 13.01% | 0.28% |
| 2 | 93.73% | 6.26% | 0.01% |
| 3 | 96.17% | 3.83% | 0.00% |
| 4 | 97.43% | 2.57% | 0.00% |
| 5 | 98.02% | 1.99% | 0.00% |
| 6 | 98.37% | 1.63% | 0.00% |
| 7 | 98.66% | 1.34% | 0.00% |
| 8 | 98.86% | 1.14% | 0.00% |
| 9 | 99.01% | 0.99% | 0.00% |
| 10 | 99.08% | 0.92% | 0.00% |
FIG. 2C
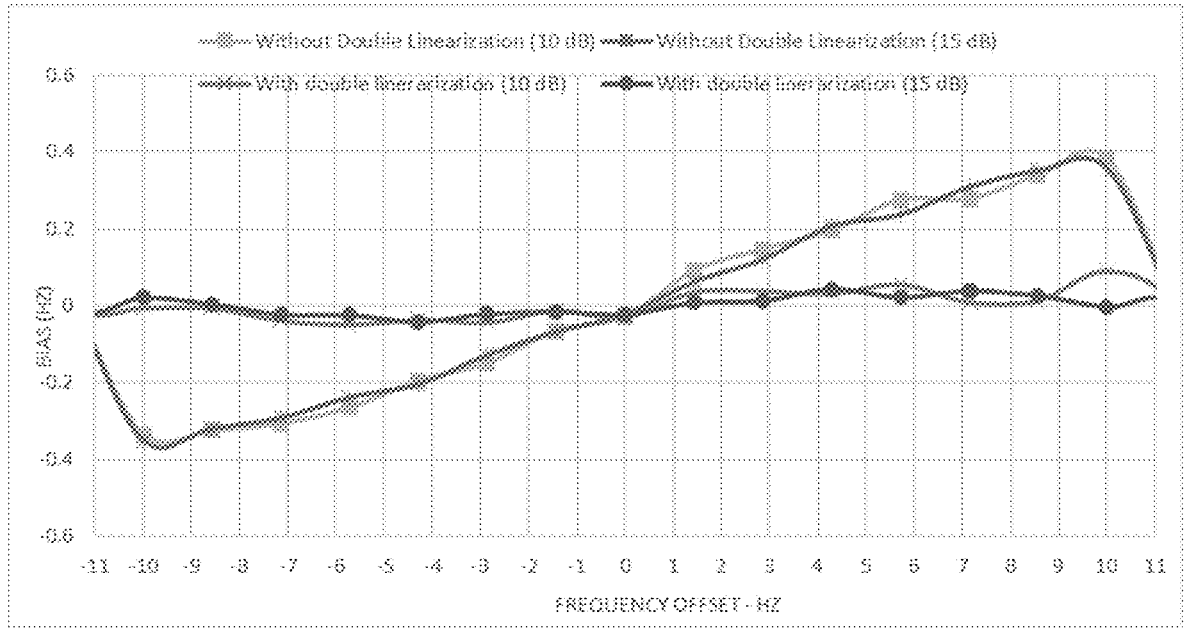
FIG. 2D
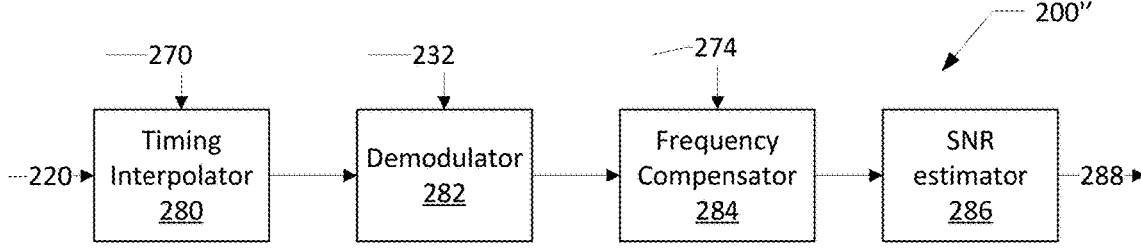
FIG. 2E

300

304

306

Waveform 302

20 ms

320

200

330

| PN Sequence 332 | IQ Modulator 334 | SRRC Filter 336 | 338 |

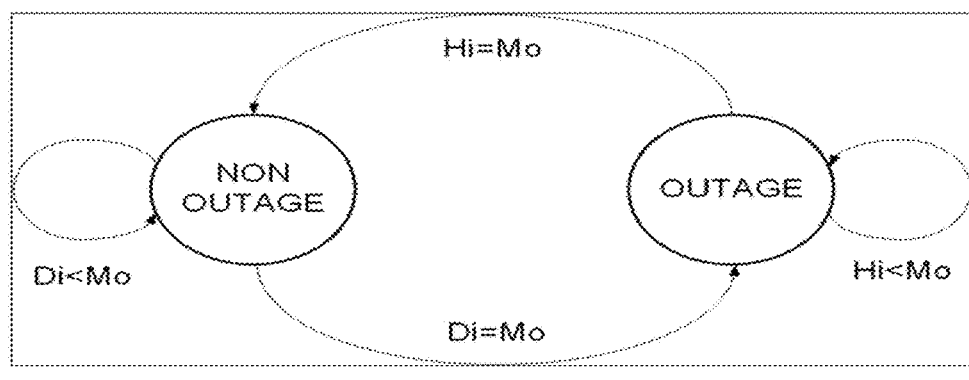

FIG. 4 receiving, at the loopback receiver, an Rx signal representing the loopback signal 502 estimating with a common Fast Fourier Transform (FFT), during an acquisition mode and a tracking mode, a timing offset and a frequency offset of the Rx signal compared to the loopback signal 504

500 square time estimating, in the tracking mode, the estimated timing offset of the Rx signal 506 generalized complex interpolating, in the acquisition mode and the tracking mode, the estimated timing offset and the estimated frequency offset of the Rx signal 508 linearizing, in the acquisition mode, a bias of the estimated timing offset and the estimated frequency offset of the Rx signal 510 following frequency variations of the loopback signal with a recursive filter tuned by a configurable forgetting factor (γ) 512 double linearizing, in the tracking mode, a bias of the estimated timing offset and the estimated frequency offset 514 synchronizing by compensating for the estimated frequency offset and the estimated timing offset of a remote oscillator 516

FIG. 5

LOOPBACK SIGNAL, RECEIVER AND TRANSMITTER FOR SYNCHRONIZATION

REFERENCE

The present application claims the benefit under 35 U.S.C. 119(e) of U.S. Provisional Application Ser. No. 63/370,079 filed Aug. 1, 2022, which is incorporated herein by reference in its entirety.

FIELD

A loopback signal, a loopback receiver and a loopback transmitter use a signal including a GOLD Pseudo Noise (PN) sequence having a circular correlation, for example, a good circular correlation. The loopback receiver uses a common Fast Fourier Transform (FFT) module for acquisition and tracking of a loopback signal. The receiver provides finer estimation using a generalized complex interpolator and operates at a very low Signal-to-Noise Ratio (SNR), for example, a negative SNR. The receiver also handles an outage. The receiver provides reliable frequency and timing offsets due to signal propagation in the presence of impairments. The loopback signal may be relayed by a satellite.

BACKGROUND

A satellite provides a loopback path for ground equipment to be synchronized with respect to the satellite, Accurate measurement of the delay and Doppler between the ground equipment and satellite is used for efficient signaling and reception. A channel between the satellite and ground equipment can be impaired or attenuated by an atmospheric loss in various frequency bands. This problem is more acute at higher frequency bands such as the Ka-band. The channel between the satellite and ground equipment can be impaired or attenuated by phase noise. Severe attenuation of the channel can lead into an outage. A loopback transmitter and receiver to provide reliable frequency and timing in the presence of these impairments is needed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a loopback signal waveform definition, and an efficient loopback receiver using a common a Fast Fourier Transform (FFT) algorithm for acquisition and tracking. The teachings permit finer estimation using a generalized complex interpolator. In some embodiments, double linearization may be used to handle timing and frequency estimation bias. The receiver of the present teachings operates at a very low Signal to Noise Ratio (SNR), for example, a negative SNR. In some embodiments, the receiver handles outage of the loopback signal.

In some aspects, the techniques described herein relate to a loopback receiver to synchronize timing and frequency with a loopback signal relayed to the loopback receiver, the loopback receiver including: an Rx signal representing the loopback signal received at the loopback receiver; and a common Fast Fourier Transform (FFT) to estimate, during an acquisition mode and a tracking mode, an estimated timing offset and an estimated frequency offset of the Rx signal compared to the loopback signal, wherein the loopback signal includes a burst including a GOLD Pseudo Noise (PN) sequence having a good circular correlation and the GOLD PN sequence has cross-correlations within a set.

In some aspects, the techniques described herein relate to a loopback receiver, further including a square time estimator, in the tracking mode of the Rx signal, to calculate the estimated timing offset.

In some aspects, the techniques described herein relate to a loopback receiver, further including a generalized complex interpolator, in the acquisition mode and the tracking mode of the Rx signal, to calculate the estimated timing offset and the estimated frequency offset.

In some aspects, the techniques described herein relate to a loopback receiver, further including a filter to linearize, in the acquisition mode of the Rx signal, a bias of the estimated timing offset and the estimated frequency offset.

In some aspects, the techniques described herein relate to a loopback receiver, further including a recursive filter tuned by a configurable forgetting factor ($\gamma$) to follow frequency variations of the Rx signal, wherein the configurable forgetting factor is based on one more of a target SNR, a timing drift rate and a frequency drift rate.

In some aspects, the techniques described herein relate to a loopback receiver, further including a first order filter having a forgetting factor ($\gamma$) of 0.1 to follow frequency and timing variations of the Rx signal.

In some aspects, the techniques described herein relate to a loopback receiver, further including a double linearizer, in the tracking mode, to correct a bias of the estimated timing offset and the estimated frequency offset.

In some aspects, the techniques described herein relate to a loopback receiver, wherein the common FFT transitions from the acquisition mode to the tracking mode after Ntrans acquisitions of the Rx signal.

In some aspects, the techniques described herein relate to a loopback receiver, wherein a Signal to Noise Ratio (SNR) of the Rx signal is less than 5 dB.

In some aspects, the techniques described herein relate to a loopback receiver, wherein a Signal to Noise Ratio (SNR) of the Rx signal is less than 0 dB.

In some aspects, the techniques described herein relate to a loopback receiver, wherein the FFT provides an outage flag metric to indicate that the loopback receiver has detected an outage of the Rx signal and is operating in an outage state.

In some aspects, the techniques described herein relate to a loopback receiver, wherein, the common FFT in the tracking mode, saves a filter state when not in outage and sets the filter state to the saved filter state when exiting from the outage state.

In some aspects, the techniques described herein relate to a method for synchronizing timing and frequency with a loopback signal relayed to a loopback receiver, the method including: receiving, at the loopback receiver, an Rx signal representing the loopback signal; and estimating with a common Fast Fourier Transform (FFT), during an acquisition mode and a tracking mode, an estimated timing offset and an estimated frequency offset of the Rx signal compared to the loopback signal, wherein the loopback signal includes a burst including a GOLD Pseudo Noise (PN) sequence having a good circular correlation and the GOLD PN sequence has cross-correlations within a set.

In some aspects, the techniques described herein relate to a method, further including generalized complex interpolating, in the acquisition mode and the tracking mode, the estimated timing offset and the estimated frequency offset of the Rx signal.

In some aspects, the techniques described herein relate to a method, further including linearizing, in the acquisition mode, a bias of the estimated timing offset and the estimated frequency offset of the Rx signal.

In some aspects, the techniques described herein relate to a method, further including using a recursive filter tuned by a configurable forgetting factor ($\gamma$) to follow frequency variations of the Rx signal, wherein the configurable forgetting factor is based on one more of a target SNR, a timing drift rate and a frequency drift rate.

In some aspects, the techniques described herein relate to a receiver to synchronize timing and frequency with a signal relayed to the receiver, the receiver including: an Rx signal representing the signal received at the receiver; a common Fast Fourier Transform (FFT) to estimate, during an acquisition mode and a tracking mode, an estimated timing offset and an estimated frequency offset of the Rx signal compared to the signal; a generalized complex interpolator, in the acquisition mode and the tracking mode of the Rx signal, to calculate the estimated timing offset and the estimated frequency offset; and a double linearizer, in the tracking mode, to correct a bias of the estimated timing offset and the estimated frequency offset.

In some aspects, the techniques described herein relate to a receiver, further including a square time estimator, in the tracking mode of the Rx signal; and setting a linearized timing offset equal to the estimated timing offset.

In some aspects, the techniques described herein relate to a receiver, wherein the double linearizer includes a look up table and a linearized frequency offset is based on using a multiplier determined as a value associated with the estimated timing offset in the look up table.

In some aspects, the techniques described herein relate to a receiver, further including a filter to linearize, in the acquisition mode of the Rx signal, a bias of the estimated timing offset and the estimated frequency offset.

In some aspects, the techniques described herein relate to a transmitter to generate a loopback signal for frequency and timing synchronization, the transmitter including: a GOLD Pseudo-Noise (PN) sequence; and an In-phase and Quadrature modulator to modulate the PN sequence to generate an IQ modulated PN sequence, wherein the GOLD PN sequence has a circular correlation and the GOLD PN sequence has cross-correlations within a set.

In some aspects, the techniques described herein relate to a transmitter, further including a SRRC filter to filter the IQ modulated PN sequence.

In some aspects, the techniques described herein relate to a transmitter, further including an antenna to transmit a 20 ms burst including a first guard band, the IQ modulated PN sequence and a second guard band.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 2C illustrates residual frequency offset error histogram of a simulated transition from acquisition to tracking mode at SNR of 5 dB, according to various embodiments.

FIG. 2D compares biases in the frequency estimate with and without double (or joint) linearization for 10 dB and 15 dB over different frequency offsets.

FIG. 2E illustrates a receiver using a frequency and timing offset according to various embodiments.

Figure 3A:
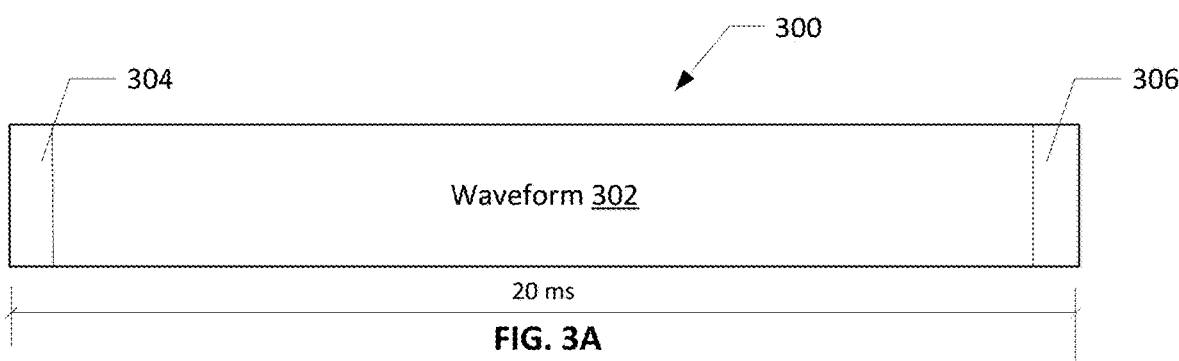

FIG. 3A illustrates a loopback signal burst, according to various embodiments.

Figure 3B:
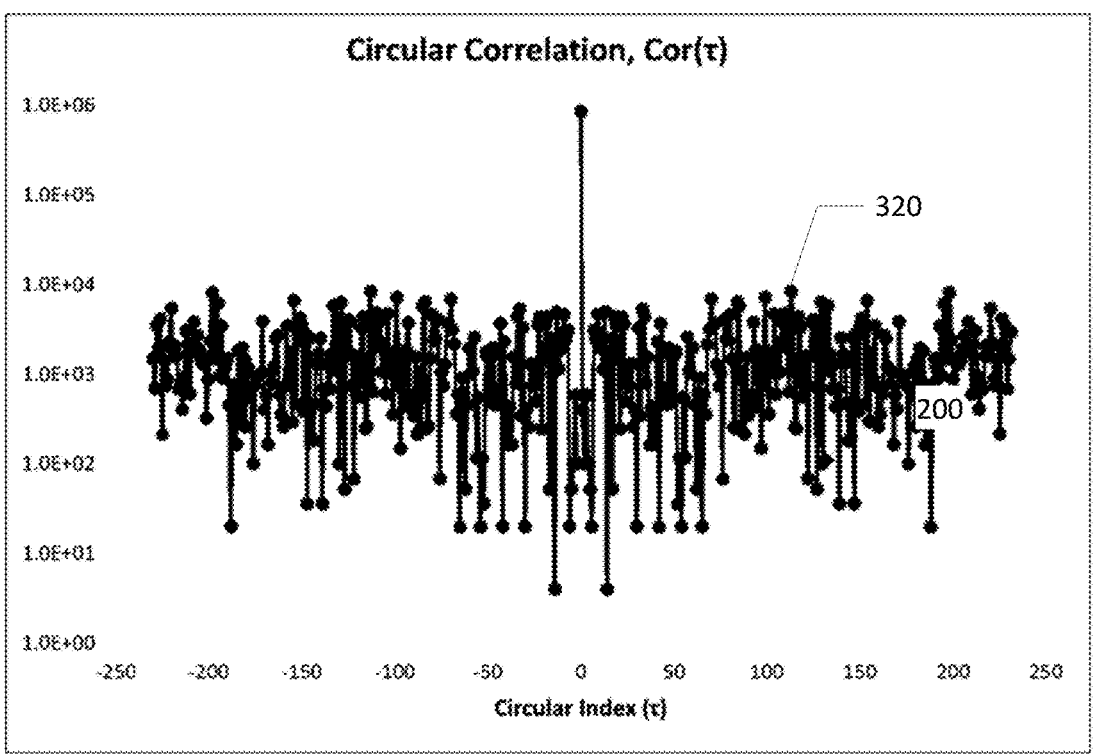

FIG. 3B illustrates a circular correlation of transmitted PN sequence waveform, over different timing lags according to various embodiments.

Figure 3C:
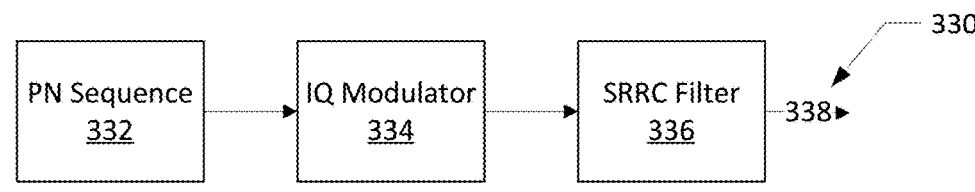

FIG. 3C illustrates a loopback signal transmitter according to various embodiments.

FIG. 4 illustrates outage detection state transitions according to various embodiments.

FIG. 5 illustrates a method for synchronizing timing and frequency with a loopback signal relayed to a loopback receiver.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a loopback signal waveform definition, and an efficient loopback receiver using a common a Fast Fourier Transform (FFT) algorithm for acquisition and tracking. The teachings permit finer estimation using a generalized complex interpolator. In some embodiments, double linearization may be used to handle timing and frequency estimation bias. The receiver of the present teachings operates at a very low Signal to Noise Ratio (SNR), for example, a negative SNR. In some embodiments, the receiver handles outage of the loopback signal.

Figure 1:
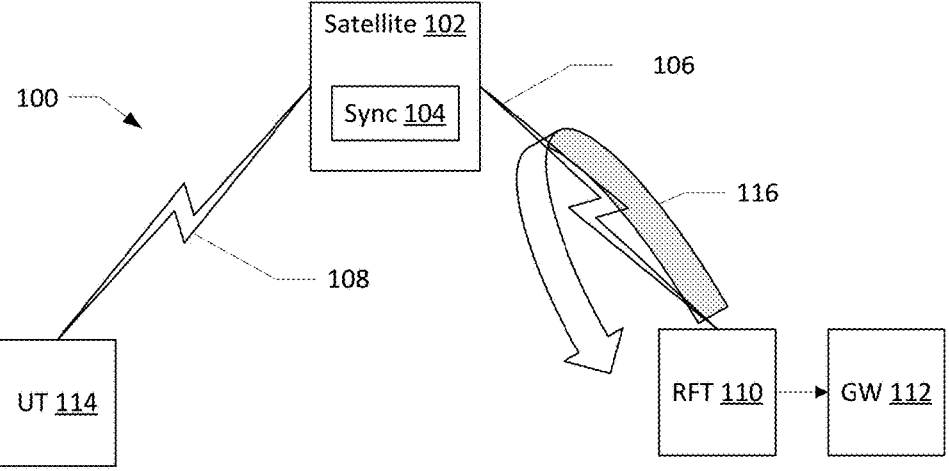
FIG. 1 illustrates a satellite system according to various embodiments.

FIG. 1 illustrates a satellite system according to various embodiments.

A satellite system 100 may include a satellite 102 communicating with a gateway 112 via a Radio Frequency Terminal (RFT) 110 and user terminal 114 (UT). Communications between the satellite 102 and the RFT 110 may be via a feeder link 106, for example, in the Ka band. The RFT 110 typically includes a satellite antenna and RF equipment. Communications between the satellite 102 and the UT 114 may be via a service link 108, for example, in the L-band. The feeder link 106 may include a loopback signal 116 relayed by a synchronization module 104 disposed in the satellite 102. The relayed loopback signal may be received by a receiver and used for frequency and timing {f,t} synchronization. The loopback signal 116 may be received at the GW 112. The GW 112 may use the received loopback signal to estimate a satellite oscillator frequency and timing drifts. The GW 112 may adjust a GW oscillator with the satellite oscillator to compensate for the satellite oscillator frequency and timing drifts.

Figure 2:
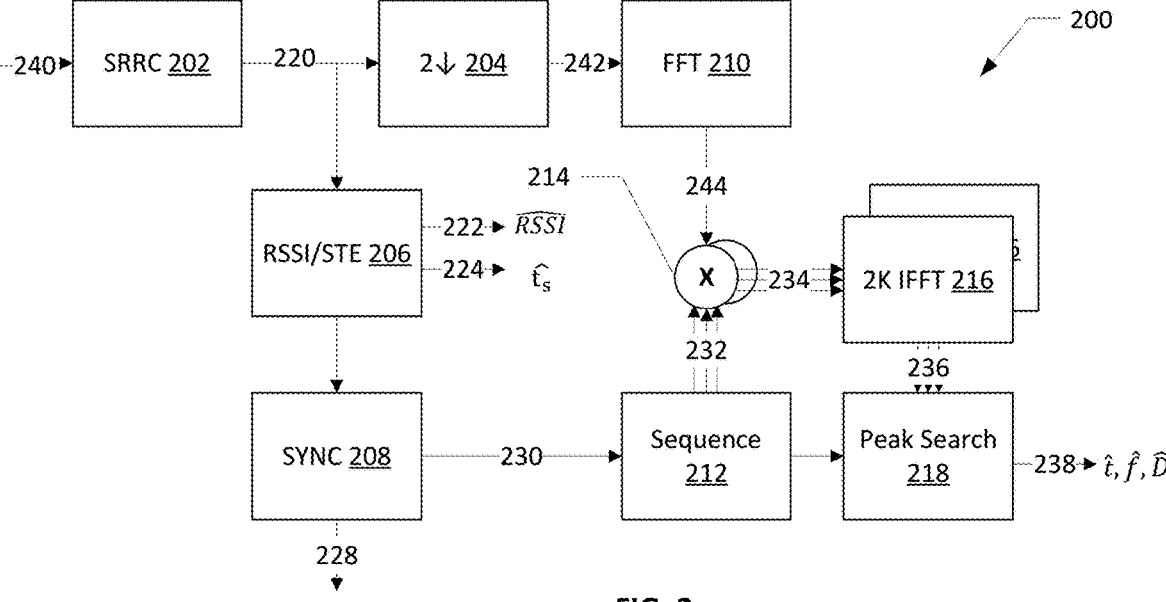
FIG. 2 illustrates a logical view of RX processing for a loopback signal transceiver according to various embodiments.

FIG. 2 illustrates a logical view of RX processing for a loopback signal transceiver according to various embodiments.

A receiver 200 may provide a loopback signal 240 to a Square Root Raised Cosine (SRRC) filter (SRRC filter 202) to generate a received signal 220 at 4× symbol rate. In some embodiments, the loopback signal 240 is a PN sequence received by a satellite at Ka band to help a gateway to achieve frequency and time synchronization. In some embodiments, the loopback signal 240 may be a continuous wave signal repeating the PN sequence interleaved by some guard symbols. The PN sequence may be a GOLD PN sequence. The PN sequence may have a good circular correlation. The receiver 200 acquires the loopback signal 240 within a defined frequency and timing range with enough accuracy to allow the receiver 200 to acquire and track the variations of the loopback signal 240 over time. The receiver 200 tracks the loopback signal 240 after signal acquisition. After acquisition a frequency and timing of the loopback signal 240 frequency may be refined and continuously tracked for variations over time; to provide a stable reference for synchronization between a gateway and the satellite.

The received signal 220 may be provided to a Received Signal Strength Indicator (RSSI)/Square Time Estimator (STE) (RSSI/STE 206) to generate an RSSI correction 222 and a frame start correction 224. The RSS/STE 206 may be a recursive square time estimator with a time offset range of, for example, +/−21.3 μs (or +/−Ts/2). The RSSI/STE 206 may provide the received signal 220 to a sync manager 208 for linearization, acquisition, tracking and outage filtering of the loopback signal 240. The sync manager 208 provides acquisition, tracking and outage state control. The sync manager 208 may provide statistical reports 228. The statistical reports 228 may include one or more of a RX state, an outage flag metric, a frequency estimate, a Signal to Noise (SNR) estimate, an RSSI estimate or the like. The sync manager 208 may selectively output an acquisition frequency $f_{acq}$ to initially acquire or to reacquire the $f_{acq}$. The sync manager 208 may selectively output an acquisition timing $t_{acq}$ to initially acquire or to reacquire the $f_{acq}$. After acquisition, the sync manager 208 may selectively track or to retrack the $f_{trk}$. The sync manager 208 may determine whether a primary or redundancy signal is to be acquired and tracked based on their respective SNR and provide the determination as signal 230 to a sequence provider 212. The receiver 200 may provide SNR and RSSI estimates for a processed frame. The sync manager 208 may receive an RSSI estimation from the RSSI/STE 206 that may be made available by the statistical reports 228.

The received signal 220 may be reduced by a 2× divider 204. The 2× divider 204 may output a 2× sampled signal 242 to a FFT 210. The FFT 210 may be a 2 k Fast Fourier Transform (FFT) with zero padding to generate inputs 244 (v(n)) to be correlated by an multiplier 214 against references 232 (Ref(n)) provided by a sequence provider 212. The n references 232 from the sequence provider 212 may be N pre-computed sequences in the frequency domain that are used for acquisition and tracking. The multiplier 214 combines the inputs 244 and the N references 232 to provide a combination 234 (Zk(n)) to an IFFT 216 (Inverse Fast Fourier Transform) to generate outputs 236 (Rk(n)). The outputs 236 are used by a peak search 218. The peak search 218 provides corrections 238, for example, a frequency peak search, an interpolation timing and a frequency offset estimation detection metric ($\hat{t}$, $\hat{f}$, $\hat{D}$). In some embodiments, the peak search 218 may calculate A(k)=Max(Rk(n)) over N=2048. The outputs 236 may define a frequency index set to Kmax that is computed as ArgMax(A(k)) over k. A time index may be set to Kmax.

The receiver 200 may operate in an acquisition mode and a tracking mode. The receiver may provide $F_{est0}$ to correct an oscillator, for example, a Numerically Correctable Oscillator (NCO). $F_{est0}$ may be calculated as $$F_{est0} = \sum_{i=1}^{Ntrans} Freq. \ estimate \ (i).$$

The receiver may provide $T_{est0}$ to correct a buffer pointer, for example, a Digital Down Converter (DDC) buffer pointer. $T_{est0}$ may be calculated as $$T_{est0} = \sum_{i=1}^{Ntrans} Delay \ estimate \ (i).$$

Acquisition Mode

Acquisition mode may use a FFT (2048) using, for example, a frequency offset of +/−708.3 Hz with a time offset range +/−5 ms based on 65 hypotheses. For acquisition, a 20 ms buffer of RX samples out of a match filter at 2× may be used. It may output a frequency estimate ($F_{est0}$) in Hz, a delay estimate ($T_{est0}$) in μs and an loopback signal detection indicator.

In some embodiments, a Generalized Complex Lagrange (GCL) interpolator may be used in acquisition mode to enhance $F_{est0}$ and $T_{est0}$. The GCL interpolator may be implemented within or immediately after the peak search 218 for example.

In some embodiments, the receiver may transition from acquisition to tracking after $N_{trans}$ acquisitions. $N_{trans}$ can be used to an acquisition detection into a desired range. For example, a loopback signal detection with $N_{trans}$ set to 100 produces an error rate per the following table.

| | |
|---|---|
| Probability of False Alarm | $<10^{-4}$ |
| Probability of Missed Detection @ −5 dB | $<5 * 10^{-2}$ |
| Probability of Missed Detection @ 0 dB | $<10^{-2}$ |
| Probability of Missed Detection @ 5 dB | $<10^{-3}$ |
| Probability of Missed Detection @ 10 dB | $<10^{-4}$ |
| Probability of Missed Detection @ 15 dB | $<10^{-5}$ |

Tracking Mode

Figures 2A, 2B:
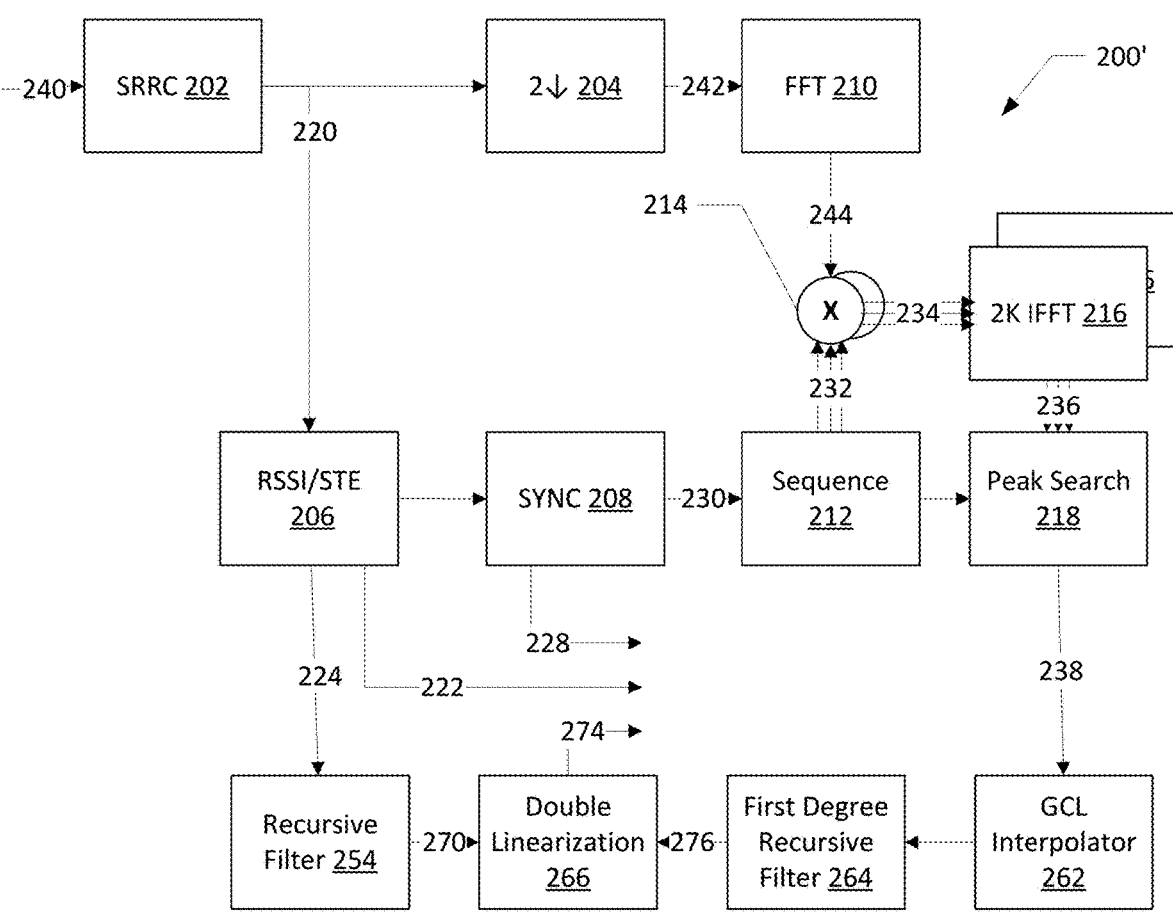
FIG. 2A illustrates a tracking mode receiver according to various embodiments.
FIG. 2B illustrates residual frequency offset error histogram of a simulated transition from acquisition to tracking mode at SNR of 5 dB, according to various embodiments.

FIG. 2A illustrates a tracking mode receiver according to various embodiments.

A tracking mode receiver 200' may be based on the receiver 200. The Tracking mode may use outputs of the receiver 200 using, for example, a frequency offset of +/−45 Hz with a time offset range +/−5 ms based on 7 hypotheses. In some embodiments, the time offset range may be +/−20 μs or less. The tracking mode receiver 200' may use the recursive square time estimation from the RSSI/STE 206 with a time offset range of, for example, +/−21.3 μs (or +/−Ts/2). For tracking, a 20 ms buffer of RX samples out of a match filter at 4× sample speed (for example received signal 220) may be used. The tracking mode receiver 200' may output a finer frequency estimate 274 ($F_{est0}$) in Hz, a delay estimate 270 ($T_{est0}$) in μs, an SNR estimate in dB, an RSSI estimate in dBm and an outage flag metric within the statistical reports 228.

In some embodiments, the recursive square time estimation from the RSSI/STE 206 may be processed by a recursive filter 254. The delay (timing offset) estimation may use the recursive square time estimation with the recursive filter 254 ($\gamma$=0.25) to provide the delay estimate 270 ($T_{est0}$).

In some embodiments, frequency offset estimation may be performed by using the receiver 200 (N=2048) for an initial frequency estimate. The initial frequency estimate may be improved with a Generalized Complex LaGrange (GCL) interpolator 262. An output of the interpolator 262 may be provided to a recursive filter 264 ($\gamma$=0.1) to reduce the standard deviation of the frequency estimate 276. The recursive filter 264 may be first degree recursive filter. In the recursive filter 264, 7 may be configurable forgetting factor based on one more of a target SNR, a timing drift rate and a frequency drift rate. In some embodiments, a double linearizer 266 may be used to reduce the bias of the delay estimate 270 and the frequency estimate 276 to provide the finer frequency estimate 274. In some embodiments, a double linearizer 266 may not be used and the frequency estimate 276 may be provided as the finer frequency estimate 274.

In some embodiments, the Outage Flag Metric (LL) of the statistical reports 228 may be calculated as LL=Max(FFT point)/Energy(FFT)<TH.

A simulated transition from acquisition to tracking mode for various acquisitions counts ($N_{trans}$) tested the present teachings. The simulation used 100 k points with an SNR of 5 dB. The simulation used random frequency offsets. In the simulation, the random frequency offset ranged between +/−710.0 Hz. In the simulation, the random time offset ranged between +/−5000 p s. In the simulation, the loopback signal acquisition demodulator was run 10 times per point.

FIG. 2B illustrates residual frequency offset error histogram of a simulated transition from acquisition to tracking mode at SNR of 5 dB, according to various embodiments.

FIG. 2C illustrates residual frequency offset error histogram of a simulated transition from acquisition to tracking mode at SNR of 5 dB, according to various embodiments. Double (or Joint) Timing and Frequency Linearization FIG. 2D compares biases in the frequency estimate with and without double (or joint) linearization for 10 dB and 15 dB over different frequency offsets.

Timing and frequency estimators can exhibit biases in their estimate. As both frequency and timing estimates are not completely independent, the estimate biases may be removed jointly using both timing and frequency estimates. As can be seen in FIG. 2D, the double linearization significantly minimizes the bias in the estimate. This double (or joint) timing and frequency linearization may be achieved by the following equations:

$$F_{lin} = \alpha_F F_{est} + \beta_F T_{est} + \gamma_F$$

$$T_{lin} = \alpha_T F_{est} + \beta_T T_{est} + \gamma_T$$

These equations may be rewritten in a compact matrix form as:

$$\begin{pmatrix} F_{lin} \\ T_{lin} \end{pmatrix} = \begin{pmatrix} \alpha_F & \beta_F \\ \alpha_T & \beta_T \end{pmatrix} \begin{pmatrix} F_{est} \\ T_{est} \end{pmatrix} + \begin{pmatrix} \gamma_F \\ \gamma_T \end{pmatrix}$$

When one of the estimators (either timing or frequency) does have not any biases, then the appropriate coefficients in the matrix and vectors in the above equation can be set as 1 and 0. For example, when the timing estimator used in the receiver, such as square timing estimator, does not have any bias within the interest of timing range, then $\alpha_T$=0, $\beta_T$=1, and $\gamma_T$ can be set 0, which simplifies to the following set of equations:

$$F_{lin} = \alpha_F F_{est} + \beta_F T_{est} + \gamma_F$$

$$T_{lin} = T_{est}$$

The coefficients $\{\alpha, \beta, \gamma\}$ in the matrix and vector may be generalized as a function of $F_{est}$ and $T_{est}$. For example, the $\beta_F(T_{est})$ may be expressed as a function $T_{est}$:

$$\beta_F(T_{est}) = \begin{cases} 0.1 & \text{if } |T_{est}| < 0.2 \\ 0.15 & \text{otherwise} \end{cases}$$

This expression may be efficiently implemented by a look up table when the range of $T_{est}$ is big and many different $\beta_F$ values need to be used depending on the value of $T_{est}$.

Utilizing Timing and Frequency Offsets

FIG. 2E illustrates a receiver using a frequency and timing offset according to various embodiments.

A receiver 200" may include a timing interpolator 280 to apply a timing offset. An exemplary timing offset is the delay estimate 270. Output of the timing interpolator 280 may be provided to a demodulator 282. The demodulator 282 may use a time domain PN sequence as an input. The time domain PN sequence may be provided by the sequence provider 212, for example, as the N references 232. An output of the demodulator 282 may be provided to a frequency compensator 284 to apply a frequency offset. An exemplary frequency offset is the finer frequency estimate 274. An output of the frequency compensator 284 having being corrected for a timing and frequency offset may be provided to an SNR estimator 286. An output of the SNR estimator 286 may be an SNR 288. The SNR may be in decibels. The SNR 288 may be optionally linearized, for example, with a GCL interpolator. In some embodiments, the delay estimate 270 and the finer frequency estimate 274 may be used by a gateway to compensate for an oscillator's timing and frequency drift. The oscillator may be disposed in a relay (for example, a satellite) doing the loopback.

Loopback Signal Transmitter

FIG. 3A illustrates a loopback signal burst, according to various embodiments.

A burst 300 may include a loopback signal waveform 302, a first guard 304 and a second guard 306. The burst 300 may have a duration of 20 ms or the like. The burst 300 may include 468 symbols or the like. The first guard 304 may have a duration of 2.5 symbols. The second guard 306 may have a duration of 2.5 symbols. The loopback signal waveform 302 may be generated per FIG. 3B using a preconfigured sequence, for example, by a sequence provider 212. The burst 300 may be modulated as an In-phase/Quadrature (IQ) signal.

FIG. 3B illustrates a circular correlation of transmitted PN sequence waveform, over different timing lags according to various embodiments.

A waveform 320 may be transmitted at 23.4 kilo symbols per second (ksps). The waveform 320 may be referred to as a loopback signal waveform. The waveform 320 may have a duration of 20 ms. The waveform 320 may include a PN sequence with 463 complex symbols (PN[k], k=0, . . . 462). The waveform 320 may be bookended with guards. The PN sequence may be derived from a GOLD sequence having a good circular correlation. A good circular correlation may be computed as $$Cor(\tau) = \sum_{k=0}^{462} PN[k] * PN^*[(k + \tau)\%463],$$

where $Cor(\tau)$ is close to zero when a normalized $\tau$ is zero.

FIG. 3C illustrates a loopback signal transmitter according to various embodiments.

A transmitter 330 may include a PN sequence provider 332 providing the PN code to an IQ modulator 334. An output of the IQ modulator 334 may be provided to a SRRC filter 336. An output of the SRRC filter 336 may be sent as a transmit signal 338.

Outage Detection and Handling

FIG. 4 illustrates outage detection state transitions according to various embodiments.

Outage detection is based on an Outage Flag Metric may be calculated as LL=Max(FFT point)/Energy(FFT)<TH while in tracking mode. The following table lists exemplary parameters for outage handling.

| | | |
|---|---|---|
| LL threshold for entering outage | $T_{h0}$ | 100 |
| LL threshold for exiting outage | $T_{h1}$ | 150 |
| Number of observations | $M_0$ | 5 |

Outage detection may enter an outage state for an ith signal-to-interference and noise ratio $LL_i$, and an observation is made by comparing $LL_i$ with a threshold, $$E_i = \begin{cases} 1 & \text{single "outage" event if } LL_i < T_{h0} \\ 0 & \text{otherwise} \end{cases}$$

Multiple consecutive observations may contribute to an outage detection, as $$D_i = \sum_{k=i-M_0+1}^{i} E_k$$

In some embodiments, an "outage" is declared when: $D_i = M_0$.

Once in outage, determination of when to exit the outage stage may compare $LL_i$ with a threshold, $$L_i = \begin{cases} 1 & \text{single "out of outage" event if } LL_i > T_{h1} \\ 0 & \text{otherwise} \end{cases}$$

Multiple consecutive determinations may contribute to one detection, as $$H_i = \sum_{k=i-M_0+1}^{i} L_k$$

and "exiting an outage" may be declared when $H_i = M_0$.

Outage handling may be varied. For example, while not in the outage state, $$\text{if } E_i = \begin{cases} 0 & \text{Save the filter state } Fs \\ 1 & \text{Do nothing} \end{cases}$$

While in the outage state, the tracking filter state may be frozen to the last known good state (the values of frequency and timing offsets while loopback signal was not in outage). Thus when, $$\text{if } L_i = \begin{cases} 0 & \text{Set the filter to the saved state } Fs \\ 1 & \text{Do Nothing} \end{cases}$$

This ensures that when exiting outage, the tracking filter resumes operation from the last known good state. For example, after Mo single "outage" detections, the "outage" flag is raised by outage detection, for example, within FFT 260. Initially when the outage occurs, random values may be reported at the filter output, but as soon as the outage flag is raised, the filter output is set to a last known good state. The filter output remains there until the outage ends. Afterward the tracking resumes with the last known good state.

FIG. 5 illustrates a method for synchronizing timing and frequency with a loopback signal relayed to a loopback receiver.

A method 500 for synchronizing timing and frequency with a loopback signal relayed to a loopback receiver is provided. The method 500 may include operation 502 for receiving, at the loopback receiver, an Rx signal representing the loopback signal. The method 500 may include operation 504 for estimating with a common Fast Fourier Transform (FFT), during an acquisition mode and a tracking mode, a timing offset and a frequency offset of the Rx signal compared to the loopback signal. The method 500 may include operation 506 for square time estimating, in the tracking mode, the estimated timing offset of the Rx signal. The method 500 may include operation 508 for generalized complex interpolating, in the acquisition mode and the tracking mode, the estimated timing offset and the estimated frequency offset of the Rx signal. The method 500 may include operation 510 for linearizing, in the acquisition mode, a bias of the estimated timing offset and the estimated frequency offset of the Rx signal. The method 500 may include operation 512 for following frequency variations of the loopback signal with a recursive filter tuned by a configurable forgetting factor ($\gamma$), wherein the configurable forgetting factor is based on one more of a target SNR, a timing drift rate and a frequency drift rate. The method 500 may include operation 514 for double linearizing, in the tracking mode, a bias of the estimated timing offset and the estimated frequency offset. The method 500 may include operation 516 for synchronizing by compensating for the estimated frequency offset and the estimated timing offset of a satellite oscillator.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim:

1. A loopback receiver to synchronize timing and frequency with a loopback signal relayed to the loopback receiver, the loopback receiver comprising:
an Rx signal representing the loopback signal received at the loopback receiver; and
a common Fast Fourier Transform (FFT) to estimate, during an acquisition mode and a tracking mode, an estimated timing offset and an estimated frequency offset of the Rx signal compared to the loopback signal, wherein the loopback signal comprises a burst comprising a GOLD Pseudo Noise (PN) sequence having a good circular correlation and the GOLD PN sequence has cross-correlations within a set.

2. The loopback receiver of claim 1, further comprising a square time estimator, in the tracking mode of the Rx signal, to calculate the estimated timing offset.

3. The loopback receiver of claim 1, further comprising a generalized complex interpolator, in the acquisition mode and the tracking mode of the Rx signal, to calculate the estimated timing offset and the estimated frequency offset.

4. The loopback receiver of claim 3, further comprising a filter to linearize, in the acquisition mode of the Rx signal, a bias of the estimated timing offset and the estimated frequency offset.

5. The loopback receiver of claim 3, further comprising a recursive filter tuned by a configurable forgetting factor (Y) to follow frequency variations of the Rx signal, wherein the configurable forgetting factor is based on one more of a target SNR, a timing drift rate and a frequency drift rate.

6. The loopback receiver of claim 3, further comprising a first order filter having a forgetting factor ($\gamma$) of 0.1 to follow frequency and timing variations of the Rx signal.

7. The loopback receiver of claim 3, further comprising a double linearizer, in the tracking mode, to correct a bias of the estimated timing offset and the estimated frequency offset.

8. The loopback receiver of claim 1, wherein the common FFT transitions from the acquisition mode to the tracking mode after $N_{trans}$ acquisitions of the Rx signal.

9. The loopback receiver of claim 1, wherein a Signal to Noise Ratio (SNR) of the Rx signal is less than 5 dB.

10. The loopback receiver of claim 1, wherein a Signal to Noise Ratio (SNR) of the Rx signal is less than 0 dB.

11. The loopback receiver of claim 1, wherein the FFT provides an outage flag metric to indicate that the loopback receiver has detected an outage of the Rx signal and is operating in an outage state.

12. The loopback receiver of claim 11, wherein, the common FFT in the tracking mode, saves a filter state when not in outage and sets the filter state to the saved filter state when exiting from the outage state.

13. A method for synchronizing timing and frequency with a loopback signal relayed to a loopback receiver, the method comprising:
receiving, at the loopback receiver, an Rx signal representing the loopback signal; and
estimating with a common Fast Fourier Transform (FFT), during an acquisition mode and a tracking mode, an estimated timing offset and an estimated frequency offset of the Rx signal compared to the loopback signal, wherein the loopback signal comprises a burst comprising a GOLD Pseudo Noise (PN) sequence having a good circular correlation and the GOLD PN sequence has cross-correlations within a set.

14. The method of claim 13, further comprising generalized complex interpolating, in the acquisition mode and the tracking mode, the estimated timing offset and the estimated frequency offset of the Rx signal.

15. The method of claim 14, further comprising linearizing, in the acquisition mode, a bias of the estimated timing offset and the estimated frequency offset of the Rx signal.

16. The method of claim 14, further comprising using a recursive filter tuned by a configurable forgetting factor ($\gamma$) to follow frequency variations of the Rx signal, wherein the configurable forgetting factor is based on one more of a target SNR, a timing drift rate and a frequency drift rate.

17. A receiver to synchronize timing and frequency with a signal relayed to the receiver, the receiver comprising:
an Rx signal representing the signal received at the receiver;
a common Fast Fourier Transform (FFT) to estimate, during an acquisition mode and a tracking mode, an estimated timing offset and an estimated frequency offset of the Rx signal compared to the signal;
a generalized complex interpolator, in the acquisition mode and the tracking mode of the Rx signal, to calculate the estimated timing offset and the estimated frequency offset; and
a double linearizer, in the tracking mode, to correct a bias of the estimated timing offset and the estimated frequency offset.

18. The receiver of claim 17, further comprising a square time estimator, in the tracking mode of the Rx signal; and setting a linearized timing offset equal to the estimated timing offset.

19. The receiver of claim 17, wherein the double linearizer comprises a look up table and a linearized frequency offset is based on using a multiplier BF determined as a value associated with the estimated timing offset in the look up table.

20. The receiver of claim 17, further comprising a filter to linearize, in the acquisition mode of the Rx signal, a bias of the estimated timing offset and the estimated frequency offset.

* * * * *